United States Patent [19]
Saji et al.

[11] Patent Number: 5,265,040
[45] Date of Patent: Nov. 23, 1993

[54] METHOD AND DEVICE FOR DISPLAYING INFORMATION ON SIMULATION RESULT IN A NUMERICAL SIMULATION SYSTEM

[75] Inventors: Miyuki Saji, Funabashi; Chisato Konno, Inagi; Yukio Umetani, Hachioji, all of Japan

[73] Assignee: Hitachi, Ltd., Tokyo, Japan

[21] Appl. No.: 593,568

[22] Filed: Oct. 10, 1990

Related U.S. Application Data

[63] Continuation of Ser. No. 245,201, Aug. 29, 1988, abandoned.

[30] Foreign Application Priority Data

Aug. 28, 1987 [JP] Japan .................. 62-212758

[51] Int. Cl.$^5$ ............................. G06F 15/20
[52] U.S. Cl. ..................... 364/578; 395/141; 364/505
[58] Field of Search ........ 364/578, 579, 200 MS File, 364/900 MS File, 300, 512, 505; 395/141, 120, 119, 118

[56] References Cited

U.S. PATENT DOCUMENTS

T915,006 10/1973 Friedman ............... 364/300
4,742,473 5/1988 Shugar et al. ........... 364/518

OTHER PUBLICATIONS

Autodesk Inc. Publications: Auto Solid MSL788BR ©1988, Auto CAD MAC988.6 ©1988 and Autodesk MAD488CP.1 ©1988.
Phoenics Leadership in Computational Fluid Dynamics NH10587 Cham of North American, Inc. Jan. 1988.
*IEEE Tokyo,* "A high Level Programming Language for Numerical Simulation: DEQSOL", C. Kon'no, et al., Denshi Tokyo No. 25 (1986).
"Advanced Implicit Solution Function of DEQSO and Its Evaluation", Reprinted for the Proceedings of the Fall Joint Computer Conference Nov. 2-6, 1986, Dallas, Tex., by C. Kon'no, et al.
*Convergence of Point Interative Methods,* "Numerical Methods for Partial Differential Equations" W. F. Ames, Academic Press, 1977.

*Primary Examiner*—Jack B. Harvey
*Assistant Examiner*—Ellis B. Ramirez
*Attorney, Agent, or Firm*—Antonelli, Terry, Stout & Kraus

[57] ABSTRACT

In a numerical simulation system, a method for displaying information includes the steps of generating output data of values which are dependent on at least one of coefficients and constants of a discretization equation at each mesh point, based on positions of the mesh points representing the analysis domain and having the partial differential equation defined therefor and simultaneous linear equations constructed by the discretization equations which are approximation equations of the partial differential equations; displaying the analysis domain on a display; and changing the display status of the display screen at the point corresponding to the mesh point depending on the output data at the mesh point.

15 Claims, 7 Drawing Sheets

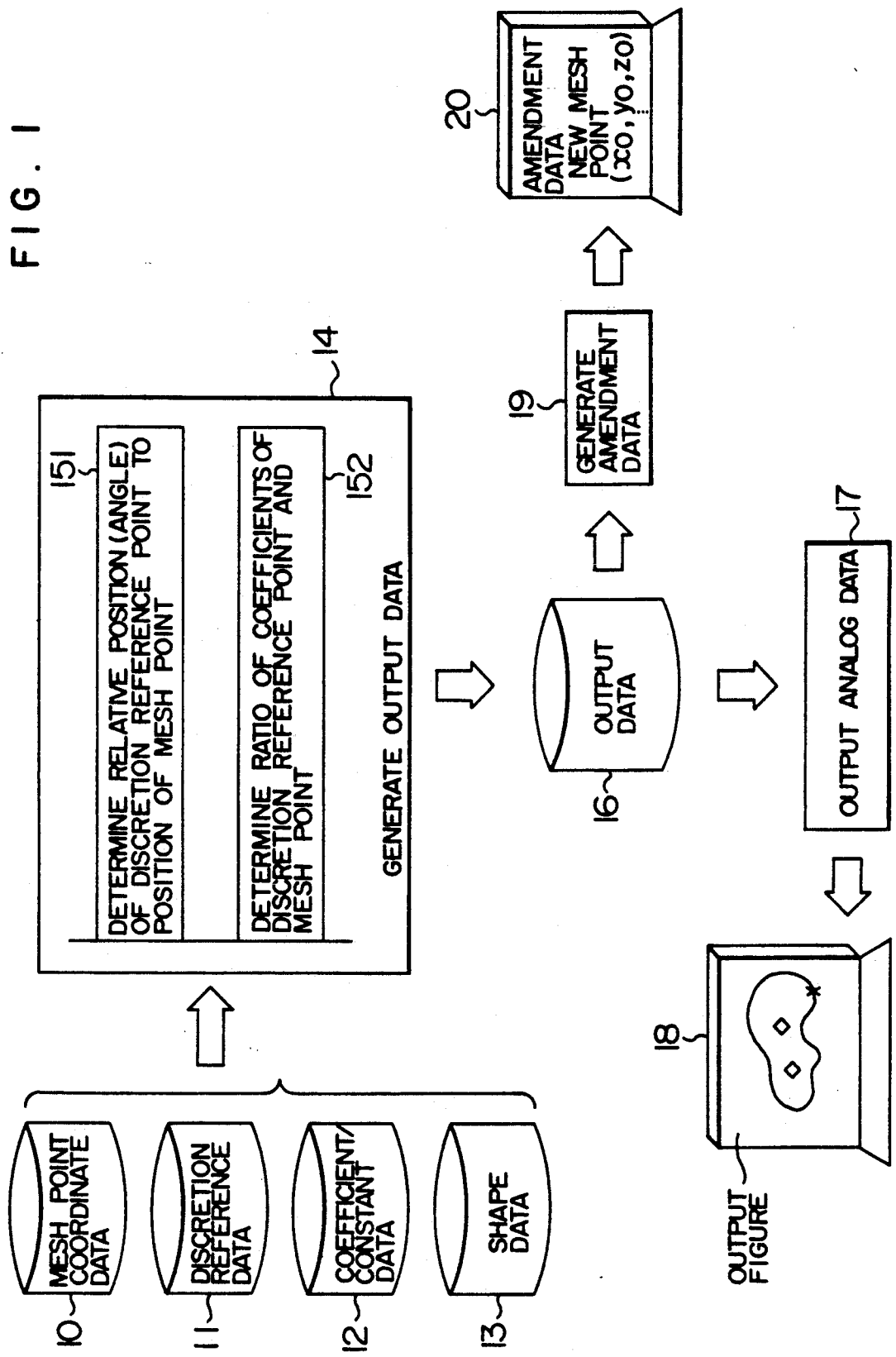

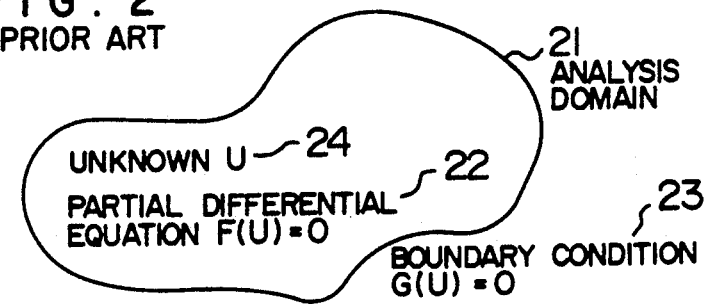
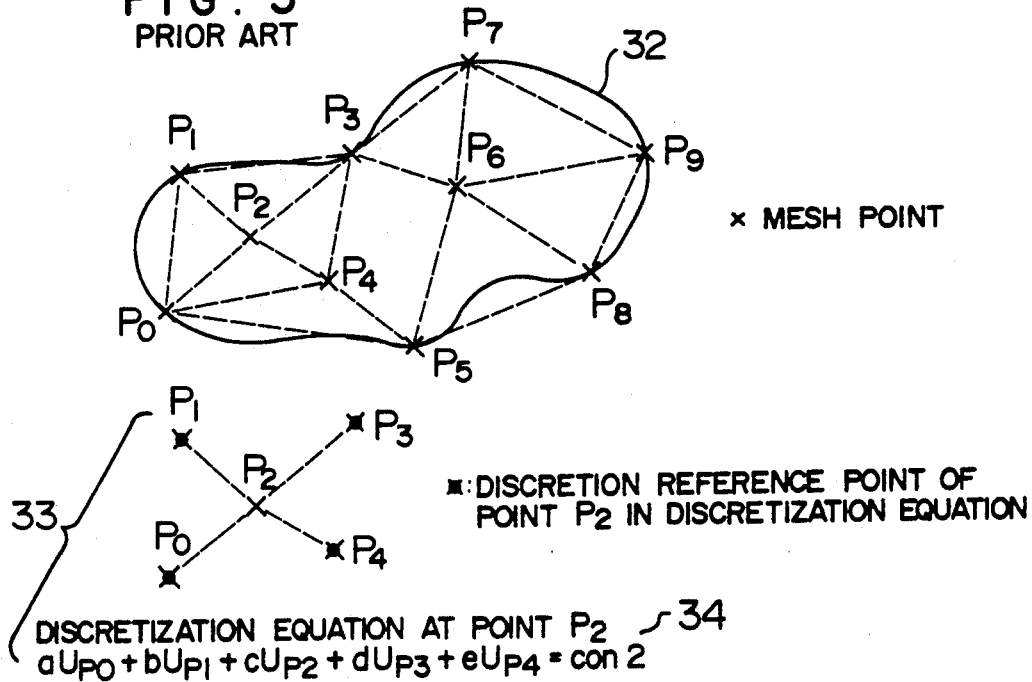

DISCRETIZATION EQUATION AT P2 ⟋64

$aU_{P0} + bU_{P1} + cU_{P2} + dU_{P3} + eU_{P4} = con_2$

| Coordinates of mesh point | Relative value to first discretion reference point | | Relative value to second discretion reference point | | | | | | Relative value to constant |
|---|---|---|---|---|---|---|---|---|---|
| | Angle | Coefficient ratio | Angle | Coefficient ratio | | | | | |
| $P_0$ $(x_0, y_0, z_0)$ | — | — | — | — | — | — | — | — | |
| $P_1$ $(x_1, y_1, z_1)$ | — | — | — | — | — | — | — | — | |
| $P_2$ $(x_2, y_2, z_2)$ | $\theta_1$ | $\frac{a}{c}$ | $\theta_2$ | $\frac{b}{c}$ | — | — | $\theta_3$ | $\frac{d}{c}$ | $\theta_4$ | $\frac{e}{c}$ | $\frac{con_2}{c}$ |
| $P_3$ | — | — | — | — | — | — | — | — | |

METHOD AND DEVICE FOR DISPLAYING INFORMATION ON SIMULATION RESULT IN A NUMERICAL SIMULATION SYSTEM

This application is a continuation of application Ser. No. 245,201, filed on Aug. 29, 1988, now abandoned.

CROSS-REFERENCE TO RELATED APPLICATIONS

The present application relates to Konno et al U.S. application Ser. No. 900,424 filed Aug. 26, 1986 (now U.S. Pat. No. 4,819,161) entitled "Method of Automatic Generation of a Computer Program for Numerical Simulation of Physical Phenomenon", and U.S. application Ser. No. 07/577,092, entitled "Method of Automatically Generating Program for Solving Simultaneous Partial Differential Equations by Use of Finite Element Method" filed Aug. , 1988 by Nobutoshi Sagawa, Chisato Konno and Yukio Umetani and assigned to the present assignee, based on Japanese Patent Applications No. 62-212759 filed Aug. 28, 1987 and No. 63-139275 filed Jun. 8, 1988.

BACKGROUND OF THE INVENTION

The present invention relates to preparation, amendment and execution of a numerical simulation program, and more particularly to an information output method and device suitable for indicating the nature of simultaneous linear equations constructed by discretization equations which are approximation equations of a partial differential equation representing a physical phenomenon, and for indicating amendment of a mesh point of the partial differential equation.

A physical phenomenon can be represented by a partial differential equation representing a physical quantity, a boundary condition thereof, and an analysis domain which is a definition domain thereof.

In order to simulate the physical phenomenon on a computer, simultaneous linear equations are constructed by discretization equations which are approximation equations of field equations partial differential equation and boundary condition, and they are solved in the analysis domain.

A common approximation calculation method is shown in FIGS. 2, 3 and 4. In an analysis domain 21 shown in FIG. 2, a partial differential equation 22 and a boundary condition 23 are presented. An unknown quantity U 24 is to be determined by approximation calculation. As shown by 32 in FIG. 3, the analysis domain 21 is represented by a finite number of points $P_0$–$P_9$ in the domain. Those points are called mesh points. A field equation (partial differential equation 22 or boundary condition 23) at each of the mesh points is discretized. In the discretization, a domain dependent quantity in the field equation is approximated by a relationship between the corresponding mesh point and the adjacent mesh points, and it is substituted by a linear equation between the mesh points. The adjacent mesh points are called discretization reference points (broken lines connecting the mesh points in the domain 32 of FIG. 3 represent relation of reference of the discretization), and the approximation equation derived from the discretization is called a discretization equation. For example, the discretization equation at the mesh point $P_2$ shown by 33 in FIG. 3 is an equation 34 having unknowns U at the mesh point $P_2$ and the discretization reference points $P_0$, $P_1$, $P_3$ and $P_4$. In the equation 34, $U_{P_0}$, $U_{P_1}$, $U_{P_2}$, $U_{P_3}$ and $U_{P_4}$ denote unknowns representing the quantities U at the respective mesh points, a–e denote coefficients for U's and con 2 denotes a constant. The discretization equation is defined at each of the mesh points $P_0$–$P_9$, and the simultaneous linear equations constructed by all discretization equations (FIG. 4) are solved to obtain approximation solutions of U's.

The method for solving the partial differential equation to simulate a physical amount and automatically generating, by a computer, a program therefor based on input domain shape information and the partial differential equation has been referred to by, for example, Proc. of Fall Joint Computer Conference (1986), pp 1026–1033 and Denshi Tokyo, No. 25 (1986) pp 50–53. A related invention is disclosed in U.S. patent application Ser. No. 900,424 (filed Aug. 26, 1986) assigned to the assignee of the present invention.

In such approximation calculation, a numerical error may occur in the course of calculation or a resulting solution may not be correct. Then, an operator takes steps to investigate a cause of error. In one step, whether or not a coefficient matrix 41 and a constant matrix 42 of the simultaneous linear equations (FIG. 4) constructed by the discretization equations have valid values and valid tends is checked. The purposes therefor are twofold. One of the purposes is to check whether the meaning of the partial differential equation is precisely approximated and reflected by the discretization equation, that is, whether the discretization equation is correct or not. The second purpose is to check the nature of the coefficient matrix itself to determine whether the resulting matrix is suitable for a matrix solution method.

Finally, two examples of devices for checking the coefficients of the simultaneous linear equations are explained. It is assumed that a solution of the approximation calculation diverges. The coefficient matrix thereof is checked. It is assumed that it is found that, in the discretization equations in a partial domain of the analysis domain, an absolute value of a coefficient at a discretization reference point located in a specific direction is much larger than the absolute values of other coefficients. The operator thus modifies the discretization method for that partial domain. Furthermore, it is assumed that a numerical error occurs during matrix solution in the course of approximation calculation. From the coefficient matrix thereof, it is seen that a coefficient in the discretization equation for the mesh point Pn is zero. For example, when a discretization equation is generated for the mesh point $P_2$ in 33 of FIG. 3, the coefficient of $P_2$ is zero. In this case, an iterative matrix solution method (such as a biconjugate gradient method) is not applicable. The operator recognizes the occurrence of numerical error at the mesh point Pn and takes countermeasures. In checking the coefficient matrix and the constant matrix, the numeric data may be outputted on a display terminal. A position on the analysis domain of the discretization equation which has caused error may be manually identified by the mesh point number or coordinate values. The operator may add a number of mesh points around the mesh point at which the error has occurred, or may modify the discretization equation.

In the prior art method, when the operator checks the coefficient matrix and the constant matrix of the simultaneous linear equations constructed by the discretization equations, numerical data are outputted. For example, an analysis domain of a three-dimensional cubic is divided by ten in each of x, y and z directions, and crosspoints thereof are used as the mesh points (1,331 mesh points). For each mesh points, six mesh points located in shortest distance in plus or minus x, y and z directions are used as discretization reference points. Thus, the number of coefficients and constants amounts to more than tens of thousands. It is laborious to output such numerical data on sheets and manually examine it.

In the prior art method, the coefficient matrix and the coordinates of the mesh points are separately managed. Consequently, even if the cause of an error is found in a discretization equation of the simultaneous linear equations, it is difficult to determine a corresponding point on the analysis domain.

Because of these two points, the prior art method imparts burdens to the operator and is apt to generate an error.

SUMMARY OF THE INVENTION

It is an object of the present invention to reduce the burdens on the operator with respect to the above two points and to improve an efficiency of approximation calculation by reducing error.

The operator may not know how to amend the mesh point which has caused the error and the discretization equation even if he/she is aware of such a mesh point and discretization equation.

It is another object of the present invention to present a proposal for amendment of the mesh point to the operator to improve the efficiency of the approximation calculation.

The first object may be achieved by the following two methods.

The nature of the discretization equation and the coefficients associated therewith, i.e., whether or not the discretization is easy to solve via numerical analysis, is determined by a position at which a non-zero coefficient appears in the coefficient matrix and what magnitude the non-zero coefficient has. As one method for solving the problem, the position and magnitude of the non-zero coefficients are converted to graphical or analog information (hereinafter referred to as "graphical information") such as markers of specific shape, color or size to allow intermediate visual determination of the nature of the discretization equation and coefficients, and the converted information is then outputted.

In a second method, the converted-graphical information is drawn at the position of the mesh point in the analysis domain.

The second object is achieved by the following method.

Whether the nature of the discretization equations is satisfactory or poor is determined by the coefficients thereof. For example, where an absolute value of a coefficient at a reference point is much larger than absolute values of other coefficients, the nature of the discretization equations is poor (i.e., the discretization equations are not easily solved). In many cases, discretization equations of a better nature can be obtained by providing a new mesh point between the first mesh point and the reference point. Accordingly, this may be idicated to the operator to achieve the object.

By outputting the nature of the coefficients of discretization equations as the visually and instantly determinable analog information, the operator need not directly visually man the huge numerical data of the coefficient matrix.

By drawing the analog information at the mesh points in the analysis domain, the operator may readily identify the relationship between the coefficient matrix and the mesh points.

By pointing out the discretization equation of a poor nature and indicating a mesh point to be added, the operator may readily amend the approximation calculation program.

BRIEF DESCRIPTION OF THE DRAWINGS

FIG. 1 shows a configuration of one embodiment of the present invention;

FIG. 2 shows a physical model to be analyzed;

FIG. 3 illustrates discretization of FIG. 2;

FIG. 4 shows simultaneous linear equations generated from FIG. 3;

FIGS. 2, 3 and 4 show conventional approximation calculation methods;

DESCRIPTION OF THE PREFERRED EMBODIMENTS

Figure 5:
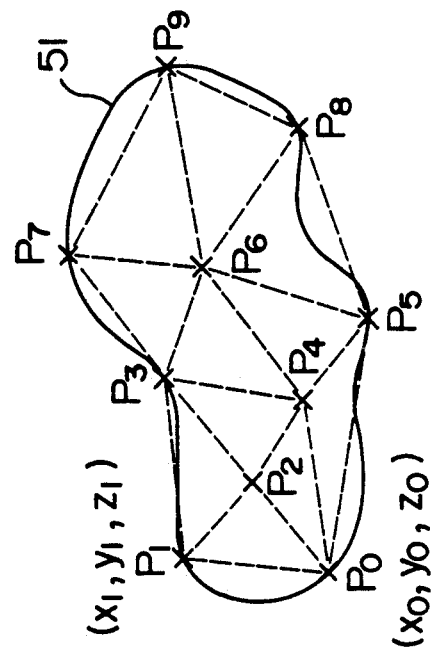
FIG. 5 shows coordinate data and matrix data as input information.

FIG. 1 shows a configuration of an information output method of the present invention.

In the present method, there are four input data. The first is shape data 13 representing a shape of an analysis domain, the second is mesh point coordinate data representing coordinates of mesh points which are representative points of the analysis domain, the third one is discretion reference data 11 representing a reference relation of the mesh points in the discretization equations, and the fourth is coefficient/constant data 12 representing a coefficient matrix and a constant matrix of the simultaneous linear equations constructed by the discretization equations of the field equations (partial differential equations and boundary condition equations). One of the outputs of the present method is an output FIG. 18 drawn at the position of the mesh point in the analysis domain, which represents analog information indicating ratios of coefficients and constants representing the nature of the discretization equations and the discretion reference relation. Another output in the present method is an output 20 which indicates a position of a mesh point to be additionally provided for amendment.

The present method comprises the following three parts. The first part is to generate output data 14. For each mesh point, a relative position (angle) of the discretion reference point to the mesh point is determined (151), and then a ratio of coefficients of the discretion reference point and the mesh point is determined (152) to generate the output data 16. The second part is to output analog data 17. The output data 16 is converted to analog data represented by a polygonal shape, size and color for each mesh point, and it is drawn at the position of the mesh point, in the analysis domain. The third part is to generate amendment data 19. The output data 16 having a large ratio of coefficients is selected for coordinates of an intermediate point between the mesh point and the reference point related to the large coefficient ratio and are outputted as a mesh point to be newly provided.

The present embodiment is explained in detail. The data 10, 11, 12, 13, 16, 18 and 20 are explained in detail, and then the parts 14, 17 and 19 are explained in detail.

The input information 10, 11 and 12 are shown in FIG. 5 which corresponds to FIGS. 2-4. Numeral 51 denotes an analysis domain and mesh points $P_1$-$P_9$ which have coordinates $(x_0, y_0, z_0)$ ... Broken lines represent discretion reference relations. The mesh point coordinate data 10 represents spatial coordinates of the mesh points. Each mesh point has x, y and z coordinates. For example, information 51 that the coordinates of the mesh point $P_0$ is $(x_0, y_0, z_0)$ is inputted in the form of 10 of FIG. 5. The discretion reference data 11 indicates the discretion reference relation of the discretization equation for each mesh point. For example, the discretion reference points for the mesh point $P_2$ are four points $P_0$, $P_1$, $P_3$ and $P_4$ as shown by broken lines in 51, and those four points and the point $P_2$ are registered in the column $P_2$ of the data 11 which show the discretion reference relation. The coefficient/constant data 12 comprises coefficient data 52 and constant data 53. It holds coefficients and constants of the simultaneous linear equations constructed by the discretization equations at the respective mesh points. The coefficient data 52 correspond to the discretion reference data. For example, when $aU_{P0}+bU_{P1}+cU_{P2}+dU_{P3}+eU_{P4}=$con 2 (where $U_{Pn}$ is an unknown at point $P_n$ and con 2 is a constant), the data 11 and 12 are generated. The mesh points in the mesh point coordinate data 10, the discretion reference data 11 and the coefficient/constant data 12 are arranged in the same order/vertical arrangement $P_0, P_1, \ldots$ in the Tables of FIG. 5). As other input information, shape data 13 (FIG. 1) holds data representing the shape of the analysis domain in the form of coordinates.

Figure 6A:
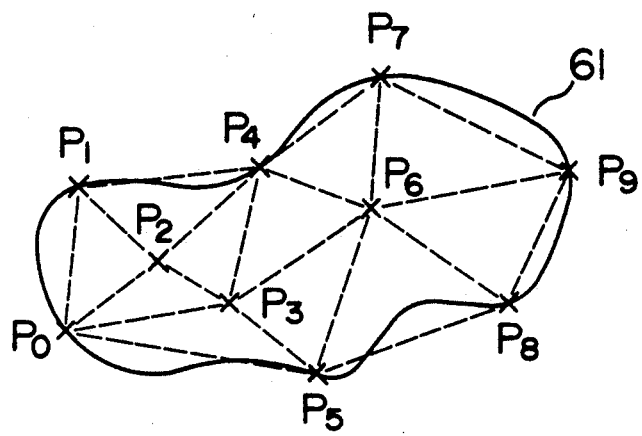
FIG. 6 shows an output figure.
Figure 6B:
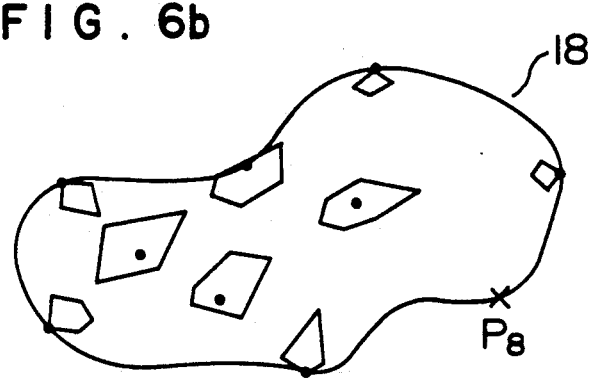
Figure 6C:
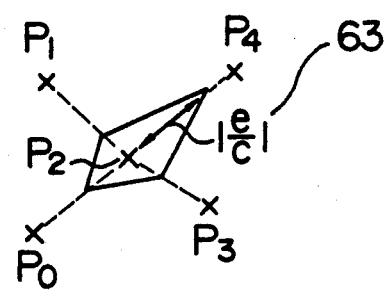

The output FIG. 18 of the output information is now explained with reference to FIG. 6. Numeral 18 denotes the output figure, and 61 and 63 are shown for explanation purposes. The analysis domain, mesh points and the reference relation thereof are shown by 61. The output figure for 61 is shown by 18 in which polygons on the mesh points (shown by dots) and a symbol X represent the nature of the discretization equations. The words "nature of a discretization equation" mean whether such discretization equation is easy to solve via numerical analysis or not. The nature is determined by a position at which a non-zero coefficient appears in the coefficient matrix and a magnitude of the non-zero coefficient. Polygons on each mesh point and a symbol X represent a position at which a non-zero coefficient appears in the coefficient matrix. The details are as follows. The meaning of the polygons is explained with reference to 63 and 64. Looking at the point $P_2$, the discretion reference points are $P_0$, $P_3$ and $P_4$. The discretization equation $aU_{P0}+bU_{P1}+cU_{P2}+dU_{P3}+eU_{P4}=$con 2 (64) is satisfied, where U is an unknown, a-e are coefficients and con 2 is a constant. It is important for the operator to understand the nature of matrix such as positions of the discretion reference points at each mesh point, ratios of coefficients of the discretion reference points, and ratios of the constants. In the present embodiment, they are outputted. Assuming that the symbols X in 63 represent mesh points, vertexes of the polygon are on lines connecting the mesh point $P_2$ and the discretion reference points $P_0$, $P_1$, $P_3$ and $P_4$. The lengths from the point $P_2$ to the vertexes are represented by absolute values of ratios of the coefficients of the point $P_2$ and the discretion reference points. The color and brightness of the polygon are changed depending on the coefficient of the mesh point and the constants of the discretization equations. If the coefficient of the mesh point in the at a position corresponding to the point $P_8$ as shown in FIG. 6b.

Figure 7:
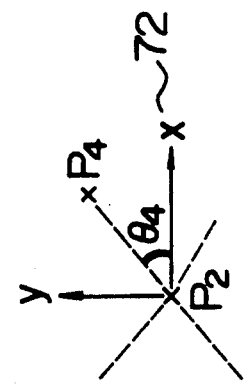
FIG. 7 shows output data as intermediate information.

The output data (16 in FIG. 1) which is the intermediate information is shown in FIG. 7. It is numerical data 16 corresponding to the output FIG. 18 of FIG. 6b. For each mesh point, the coordinates, angles of discretion reference points, coefficient ratios and constant ratios are held. The angle is one for the discretion reference point with the mesh point being an origin point. For example the angle of the discretion reference point $P_4$ at the mesh point $P_2$ is $\theta_4$, as shown by 72. The coefficient ratio is a quotient of the coefficient of the discretion reference point divided by the coefficient of the mesh point. The sequence of vertically arranged mesh points and the sequence of horizontally arranged discretion reference points of the data table 16 are same as the sequences of the discretion reference data 11 and the coefficient/constant data 12 of FIG. 5. The horizontally arranged discretion reference points include a column to indicate the corresponding mesh point. In the output data, the data column indicating the angle is blank. The data column indicating the coefficient ratio is always "1". If the coefficient at the mesh point is zero, the data column indicating the coefficient ratio is "−1" and the data column indicating the coefficient ratio to other discretion reference points is blank.

The amendment data 20 which is further output information is explained. It is a mesh point to be newly added when the nature of the discretization equations is poor. The coordinates thereof are outputted sequentially from the top of the screen.

Figure 8:
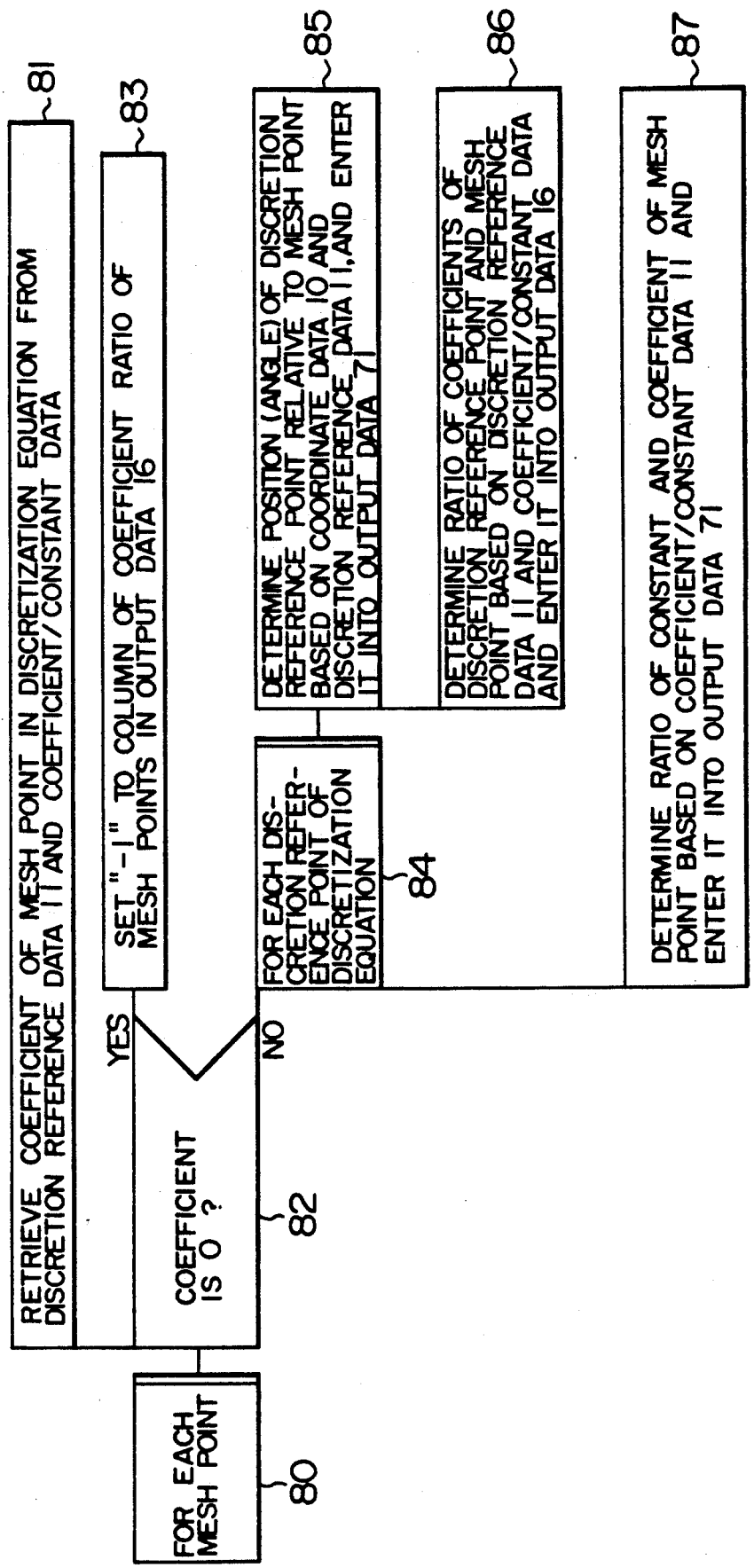
FIG. 8 illustrates generation of output data.

The output data generation step 14 of FIG. 1 is explained. In this step, the mesh point coordinate data 10, the discretion reference data 11 and the coefficient/constant data 12 of FIG. 5 are inputs and the output data 16 of FIG. 7 is an output. A flow chart thereof is shown in FIG. 8. The following steps are carried out for each mesh point in the analysis domain (80). The coefficient of the mesh point in the discretization equation is looked up based on the discretion reference data and the coefficient/constant data 12 (FIGS. 1 and 5) (81). If the looked-up coefficient is zero (82), the column in the output data 16 (FIGS. 1 and 7) which indicates the coefficient ratio of the mesh points is set to "−1" (83). If the coefficient is not zero, the following step is carried out (82). For each discretion reference point in the discretization equation for the mesh point (84), the position (angle) of the discretion reference point relative to the mesh point is determined based on the mesh point coordinate data 10 and the discretion reference data 11 (72 in FIG. 7), and it is entered into the output data 16 (85). Then, a quotient of the coefficient of the discretion reference point divided by the coefficient of the mesh point is calculated based on the discretion reference data 11 and the coefficient/constant data 52, and the ratio thereof is entered into the output data 16 (86). A quotient of the constant divided by the coefficient of the mesh point is calculated based on the coefficient/constant data 12, and the ratio thereof is entered into the output data 16 (87). The above is the flow of the output data generation step 14.

The analog data output step 17 of FIG. 1 is now explained. In the analog data generation step 17, the shape data 13 and the output data 16 of FIG. 7 are inputs and the output FIG. 18 of FIG. 6 is an output. The shape of the analysis domain is outputted from the shape data. For each mesh point, a polygon having vertexes at points of the lengths of coefficient ratio in the direction toward the discretion reference points is drawn at the corresponding mesh point in the analysis domain. The point having the coefficient ratio of mesh points of "−1" in the output data 16 is indicates by a symbol X. The constant ratio is represented by a density of color of the polygon.

Finally, the amendment data generation step 19 of FIG. 1 is explained. In the amendment data generation step 19, the output data 16 of FIG. 7 is an input and the amendment data 20 of FIG. 1 which indicates the mesh point to be newly provided is an output.

Figure 9:
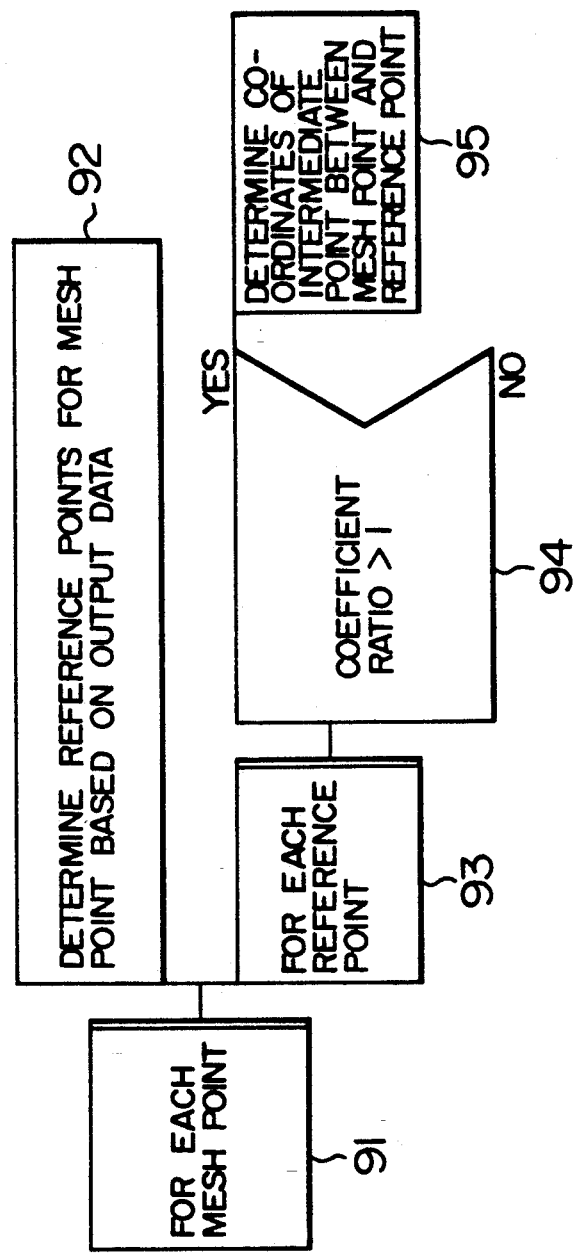
FIG. 9 shows a flow chart for generating amendment data.

The steps are shown in FIG. 9. For each mesh point, the following step is carried out (91). Reference points for the mesh point are determined based on the output data 16 (92). For each reference point, the following step is carried out (93). The column "coefficient ratio" in the output data 16 is referred to determine if it is larger than 1 or not (94). If it is larger, coordinates of an intermediate point between the mesh point and the reference point are determined (95). The coordinates are supplied to the amendment data 20 as the output of the amendment data generation step 19 and displayed as newly required coordinates.

In accordance with the present embodiment, the coefficient ratios and constant ratios at the mesh points in the analysis domain are visually indicated. Accordingly, a cause of error of program and a defect of the model for the discretization equation having a large variety of coefficient ratios can be readily identified.

In the present embodiment, the coefficient ratios and the constant ratios are outputted. Alternatively, the equal equations in the simultaneous linear equations may be detected and the mesh point thereof may be outputted, or other information on the discretization equations may be outputted. The information in the course of solution of the matrix may also be outputted. The output forms may be shape, color and size of the marker, or vector chart or animation. The input data may be simultaneous linear equations, conventional discretization equations or known coefficients.

In accordance with the present embodiment, the mesh point to be added when numerical error has occurred is indicated. Accordingly, the amendment of the program is facilitated.

In accordance with the present invention, the data representing the nature of the discretization equations which are approximation equations of the partial differential equations is converted to analog data such as size, shape and color of the marker and graphically outputted at the positions corresponding to the mesh points in the analysis domain. Accordingly, the following advantages are presented. When the operator solves the partial differential equation in a numerical analysis manner, he/she can comprehend the nature of the discretization equation without directly watching the numeric data. Accordingly, the defect in the model and the cause of error in the program can be readily detected and the efficiency in developing the numerical simulation program is improved.

In accordance with the present invention, the coordinates of the mesh point to be newly provided are outputted. Accordingly, the operator without knowledge of physical models and numerical analysis can readily amend the program, and efficiency in developing the numerical simulation program is improved.

We claim:

1. In a numerical simulation system for solving a partial differential equation relating to a physical quantity to be simulated for different mesh point signals in an analysis domain, a method of controlling display means for generating display information on a display screen comprising steps to be executed by an apparatus, the steps including:

generating, by said apparatus, for each point in the analysis domain, a ratio data signal related to a discretization equation corresponding to the partial differential equation, the ratio data signals including a group of ratios of first to second coefficient signals related to the mesh point signals, said first coefficient signal being related to a particular mesh point signal in the analysis domain and a discretization reference mesh point signal of the particular mesh point signal, and said second coefficient signal being related to the particular mesh point signal, based on positions of the mesh point signal representing the analysis domain and for which the partial differential equation is defined, and simultaneous linear equations constructed by discretization equations which are approximation equations of partial differential equations;

controlling said display means, by said apparatus, to display the analysis domain on the display screen; and controlling said display means, by said apparatus, to display an enclosed figure in a position on the display screen corresponding to one of the mesh point signals, said enclosing figure having a nature including a direction and a magnitude corresponding to the generated ratio data signal for the one mesh point signal.

2. A method according to claim 1, further comprising steps to be executed by an apparatus including:

detecting by said apparatus a mesh point signal which is not appropriate for discretization based on a ratio data signal generated for a mesh point signal in the analysis domain; and controlling said display means, by said apparatus, to display an amended mesh point signal which is to be used in place of the detected mesh point signal in response to a detection result of the detecting step.

3. A method for displaying information according to claim 2, wherein said detecting step includes the step of detecting by said apparatus a mesh point signal inappropriate for discretization when one of a group of ratios represented in the generated ratio data signal for a mesh point signal exceeds a predetermined range.

4. A method for displaying information according to claim 1, wherein the enclosed figure for the one mesh point signal is a polygon located at a display position of the one mesh point signal including vertex signals corresponding to discretization reference mesh point signals of the one mesh point signal, wherein each vertex signal is located on a line extending from the display position of the one mesh point signal to a display position of a discretization reference point signal for the one mesh point signal, and wherein a distance between each vertex signal and the display position of the one mesh point signal is proportional to the ratio of the first and second coefficient signals which correspond to the one mesh point signal.

5. A method according to claim 4, wherein the distance between each vertex signal and the display position of the one mesh point signal is proportional to an absolute value of the ratio of the first and second coefficient signals corresponding to the one mesh point signal.

6. A method for displaying information according to claim 5, wherein the generated ration data signal for each mesh point signal further includes an additional ratio of a constant term of a discretization equation which is related to the one mesh point signal to the second coefficient signal corresponding to the one mesh point signal, wherein the polygon for the one mesh point signal is displayed with a color depending upon the additional ration which corresponds to the one mesh point signal.

7. A method according to claim 6, wherein the color changes in density depending upon the additional ratio.

8. A method for displaying information according to claim 8, wherein said step of controlling said display means by said apparatus to display an enclosed figure step includes a step of controlling said display means, by said apparatus, to display, as an amended mesh point signal, a point signal located between the particular mesh point signal and the one mesh point signal.

9. In an numerical simulation system for solving a partial differential equation relating to a physical quantity to be simulated for different mesh point signals in an analysis domain, a device for controlling display means for generating display information on a display screen, said device comprising:

means for generating for each point in the analysis domain, a ratio data signal related to a discretization equation corresponding to the partial differential equation, the ratio data signals including a group of ratios of first to second coefficient signals related to the mesh point signals, said first coefficient signal being related to a particular mesh point signal in the analysis domain and a discretization reference mesh point signal of the particular mesh point signal, and said second coefficient signal being related to the particular mesh point signal, based on positions of the mesh points signals representing the analysis domain and for which the partial differential equation is defined, and simultaneous linear equations constructed by discretization equations which are approximation equations of partial differential equations;

display means responsive to said generating means for displaying the analysis domain on the display screen; and means coupled to said generating means and said display means for controlling said display means to display an enclosed figure on the display screen at a position corresponding to one of the mesh point signals, said enclosed figure having a nature including a direction and a magnitude corresponding to the generated ration data signal for the one mesh point signal.

10. A device for displaying information according to claim 9, further comprising:

means for detecting a mesh point signal which is not appropriate for discretization based on a ratio data signal generated for a mesh point signal in the analysis domain; and means responsive to said detecting means for generating an amended mesh point signal which is to be used in place of the detected mesh point signal and for supplying the amended mesh point signal to said display means to display the amended mesh point signal on the display screen.

11. In a numerical simulation system for solving a partial differential equation relating to a physical quantity to be simulated for different mesh point signals in an analysis domain, a method of controlling a display for generating display information on a display screen comprising steps to be executed by an apparatus, the steps including:

generating, by said apparatus, for the partial differential equation, ratio data signals including a group of ratios of first to second coefficient signals related to the mesh point signals, said first coefficient signal being related to a particular mesh point signal in the analysis domain and a discretization reference mesh point signal of the particular mesh point signal, and said second coefficient signal being related to the particular mesh point signal, based on positions of the mesh point signals representing the analysis domain and for which the partial differential equation is defined, and simultaneous linear equations constructed by discretization equations which are approximation equations of partial differential equations;

detecting by said apparatus, a mesh point signal which is not appropriate for discretization based on ratio data signals generated for a mesh point signal in the analysis domain; and displaying, by said apparatus, an amended mesh point signal which is to be used in place of the detected mesh point signal in response to a detection result of the detecting step.

12. A method according to claim 11, wherein said detecting step includes the step of detecting by said apparatus a mesh point signal inappropriate for discretization when one of a group of ratios included in the generated ratio data signal for a mesh point signal exceeds a predetermined range.

13. A method according to claim 12, wherein said displaying step includes a step of displaying, by said apparatus, as an amended mesh point signal, a point located between the particular mesh point signal and the one mesh point signal.

14. In a numerical simulation system for solving a partial differential equation relating to a physical quantity to be simulated for different mesh point in an analysis domain, a method of controlling a display for generating display information on a display screen comprising steps to be executed by an apparatus, the steps including:

generating by said apparatus for each point in the analysis domain, a ratio data signal related to a discretization equation corresponding to the partial differential equation, the ratio data signal including a group of ratios of first to second coefficient signals related to the mesh point signals, said first coefficient signal being related to a particular mesh point signal in the analysis domain and a discretization reference mesh point signal of the particular mesh point signal, and said second coefficient signal being related to the particular mesh point signal, based on positions of the mesh point signal representing the analysis domain and for which the partial differential equation is defined, and simultaneous linear equations constructed by discretization equations which are approximation equations of partial differential equations;

displaying, by said apparatus, the analysis domain on the display screen;

displaying, by said apparatus, an enclosed figure in a position on the display screen corresponding to one of the mesh point signals, said enclosed figure having a nature including a direction and a magnitude corresponding to the generated ratio data signal for the one mesh point signal; and modifying, by said apparatus, the mesh point signals in response to an appropriate input given by an operator when the mesh point signals include at least one unappropriated mesh point signal for which an abnormal ratio data signal has been generated, such that all the mesh point signals after the modifying of the mesh point signals have a normal generated ratio data signal.

15. A displaying method for graphic evaluation of mesh point signal used in a numerical simulation system for solving a partial differential equation relating to a physical quantity to be simulated for different mesh point signals in an analysis domain, wherein each mesh point signal is evaluated based upon a ratio data signal related to a discretization equation corresponding to the partial differential equation, the ratio data signals including a group of ratios of first to second coefficient signals related to the mesh point signals, said first coefficient signal being related to a particular mesh point signal in the analysis domain and a discretization reference mesh point signal of the particular mesh point signal, and said second coefficient signal being related to the particular mesh point signal, based on positions of the mesh point signals representing the analysis domain and for which the partial differential equation is defined, and simultaneous linear equations constructed by discretization equations which are approximation equations of partial differential equations the method comprising steps, executed by an apparatus, of:

displaying, by the apparatus, the analysis domain on the display screen; and displaying, by the apparatus, an enclosed figure in a position on the display screen corresponding to one of the mesh point signals for graphic evaluation of the one mesh point signal by an operator, said enclosed figure having a nature including a direction and a magnitude corresponding to the generated ration data signal for the one mesh point signal.

* * * * *